(12) United States Patent
Pepe et al.

(10) Patent No.: US 7,311,539 B2
(45) Date of Patent: Dec. 25, 2007

(54) DUPLEX PLUG ADAPTER MODULE

(75) Inventors: Paul John Pepe, Clemmons, NC (US); Danny Gray Dollyhigh, Mount Airy, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/117,868

(22) Filed: Apr. 29, 2005

(65) Prior Publication Data

US 2006/0246771 A1 Nov. 2, 2006

(51) Int. Cl.
*H01R 27/00* (2006.01)
*G02B 6/38* (2006.01)

(52) U.S. Cl. .......................... 439/219; 385/56
(58) Field of Classification Search ................ 439/488, 439/490, 395, 540.1, 733.1, 878, 219; 324/66, 324/149; 385/56, 88
See application file for complete search history.

(56) References Cited

U.S. PATENT DOCUMENTS

| | | | | |
|---|---|---|---|---|
| 5,764,043 | A * | 6/1998 | Czosnowski et al. | ......... 324/66 |
| 6,024,498 | A * | 2/2000 | Carlisle et al. | ............... 385/56 |
| 6,357,934 | B1 * | 3/2002 | Driscoll et al. | ............... 385/86 |
| 6,409,392 | B1 * | 6/2002 | Lampert et al. | ............... 385/56 |
| 6,492,594 | B1 * | 12/2002 | Magyar et al. | ............... 174/97 |
| 6,499,889 | B1 * | 12/2002 | Shirakawa et al. | ........... 385/88 |
| 6,554,649 | B2 * | 4/2003 | Pade | .......................... 439/620 |
| 6,574,586 | B1 | 6/2003 | David et al. | |
| 6,802,735 | B2 | 10/2004 | Pepe et al. | |
| 7,186,136 | B2 * | 3/2007 | Tiesler et al. | ............... 439/493 |
| 2003/0190123 | A1 | 10/2003 | Eberhard et al. | |
| 2004/0047565 | A1 | 3/2004 | Cheng et al. | |

FOREIGN PATENT DOCUMENTS

| EP | 0 849 602 | 6/1998 |
|---|---|---|
| EP | 1 271 708 | 1/2003 |

OTHER PUBLICATIONS

PCT International Search Report, PCT/US2006/016188, Oct. 4, 2006.

* cited by examiner

*Primary Examiner*—Chandrika Prasad

(57) ABSTRACT

A duplex plug adapter module includes a dielectric housing having a forward end and a rearward wire receiving end. The housing is configured to be mechanically coupled to first and second signal cables. A contact is held within the housing. The contact has a forward mating end and a rearward wire terminating end. The housing includes a passageway that is configured to receive a sensor probe that is shared by the first and second signal cables. The contact is configured to interconnect the sensor probe and a sensor wire.

20 Claims, 5 Drawing Sheets

DUPLEX PLUG ADAPTER MODULE

BACKGROUND OF THE INVENTION

The invention relates generally to connector modules that interface network components and, more particularly, to an adapter for monitored fiber plug network connections.

Electronic components are typically connected to an electronic network using an interconnect module that allows connections between components on the network. The interconnect module may be retained in a patch panel, or any number of other network structures that interconnect two or more separate network components.

In order to better operate large electronic networks, sensor systems have been developed to monitor connections between components within the network. The sensor system typically is integrated into an interconnect module that is retained in the patch panel. The interconnect module includes receptacle jacks, similar to phone jacks, at a mating face. The jacks receive patch cords that are connected to a first network component. Each patch cord includes an electrical cable comprised of signal wires connected to a plug at one end. The plug is received within a corresponding receptacle jack such that the signal wires in the electrical cable are electrically connected to signal contacts extending from a rear side of the interconnect module. The signal contacts are in turn connected to a second set of signal wires that extend to a second network component. Thus, the interconnect module electrically interconnects the first and second network components.

In a network that includes a sensor system, conventional interconnect modules are joined with separate sensor configurations that enable the network to determine when a plug is joined with a receptacle jack. Typically, a sensor pad is positioned on the sensor module adjacent each receptacle jack and the plug includes a probe that is connected to the monitoring system. The probe makes contact with the sensor pad when the plug is inserted in the jack and the connection is recognized by the monitoring system.

While wire, or copper, cables commonly include multiple strands of conductors, some fiber cables, such as LC duplex cabling has only one fiber conductor per cable. When using duplex fiber cabling, two cables, one for sending and one for receiving, are needed to complete a connection. The connection of the two fiber cables to the interconnect module should be recognized as only one connection by the monitoring system.

BRIEF DESCRIPTION OF THE INVENTION

In one aspect, a duplex plug adapter module is provided. The adapter module includes a dielectric housing having a forward end and a rearward wire receiving end. The housing is configured to be mechanically coupled to first and second signal cables. A contact is held within the housing. The contact has a forward mating end and a rearward wire terminating end. The housing includes a passageway that is configured to receive a sensor probe that is shared by the first and second signal cables. The contact is configured to interconnect the sensor probe and a sensor wire.

Optionally, the housing includes a chamber therein that has an internal shoulder. The contact is received in the chamber and includes a body having wings extending therefrom. The wings engage the shoulder to inhibit extraction of the contact from the housing. The housing also includes an outer surface having a window extending from the outer surface to the chamber. The window provides access to an electrical connection between the contact and the sensor probe. The housing includes clamping arms and a clamping post. The clamping arms and the clamping post include latches configured to secure the first and second signal cables between the clamping arms and the clamping post.

In another aspect, a duplex plug adapter module is provided that includes a dielectric housing configured to be mechanically coupled to first and second signal cables. A sensor probe is received in the housing. The sensor probe is shared by the first and second signal cables.

In yet another aspect, a duplex connector assembly includes a dielectric housing having a forward end and a rearward wire receiving end and a passageway extending therebetween. A sensor probe is received in the passageway proximate the forward end. A pair of cable retention channels are formed on the housing. Each one of a pair of signal cables is received in a respective one of the cable retention channels to mechanically couple the signal cables to the housing. A contact held within the housing interconnects the sensor probe and a sensor wire.

DETAILED DESCRIPTION OF THE INVENTION

Figure 1:
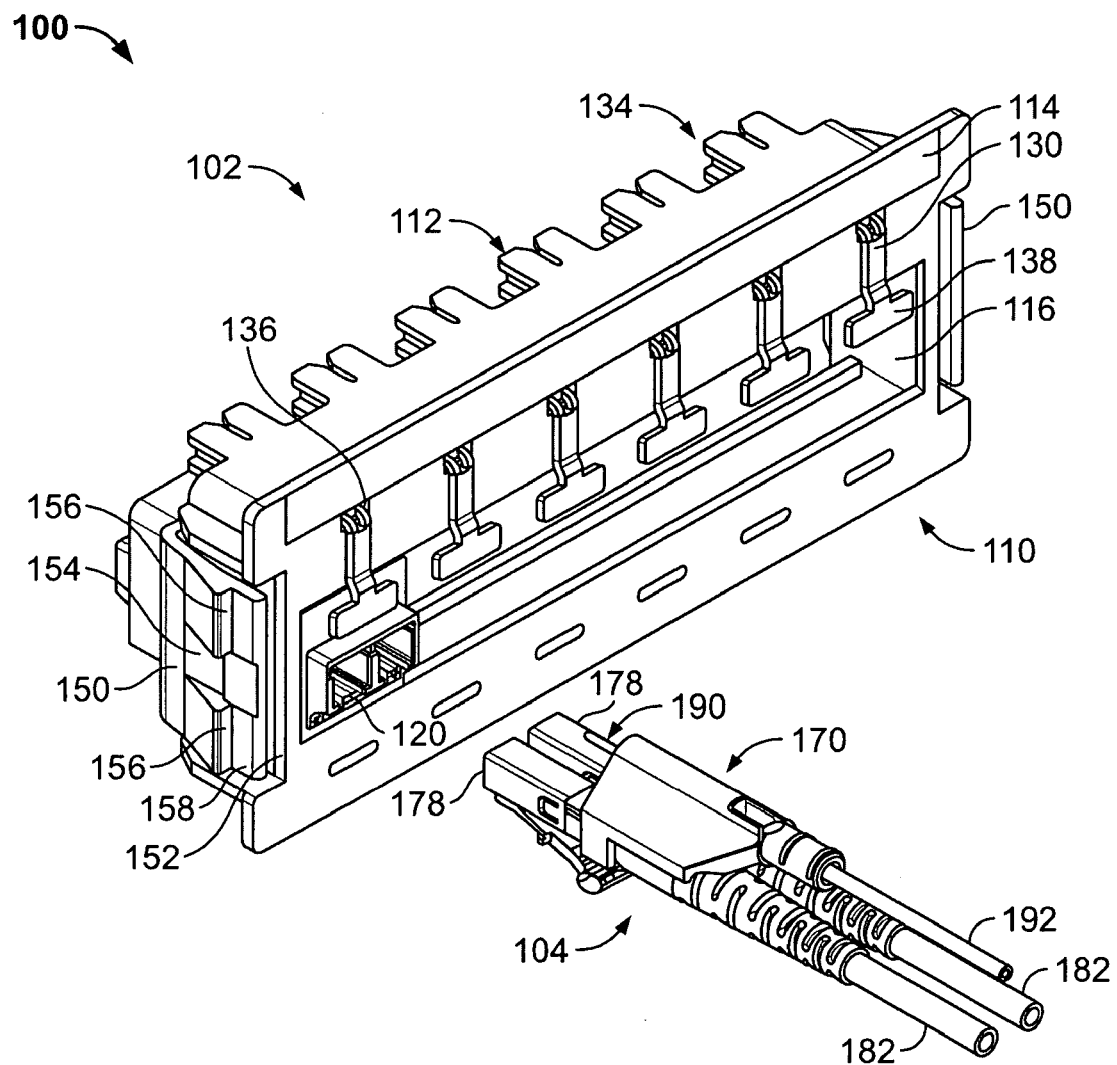
FIG. 1 is a perspective view of an interconnect system in accordance with an exemplary embodiment of the present invention.

FIG. 1 illustrates a perspective view of an exemplary interconnect system 100. The interconnect system 100 includes a known interconnect module 102, and a plug assembly 104 formed in accordance with an exemplary embodiment of the present invention.

In FIG. 1, the interconnect module 102 is viewed from a front side 110. The interconnect module 102 includes a housing 112 that has a substantially rectangular face plate 114. A receptacle channel 116 is formed in the face plate 114. A plurality of receptacle jacks can be mounted in the channel 116 to provide connections to resources on a network. The interconnect module 100 is modular in construction. That is, different types of receptacle jacks may be mounted in the interconnect module 100. In FIG. 1, the interconnect module 100 has one receptacle jack 120 mounted in the channel 116.

The interconnect module 100 also includes a plurality of sensor contacts 130 that extend from the face plate 114 to a rear side 134 of the interconnect module 100 through slots 136 extending through the housing 112. One of the plurality of slots 136 is positioned adjacent each jack 120 that is mounted in the receptacle channel 116. Each sensor contact 130 includes a sensor pad 138 aligned parallel to and positioned proximate the face plate 114. Each receptacle jack 120 is also located proximate one of the sensor pads 138, such that each receptacle jack 120 has a corresponding sensor pad 138.

The interconnect module 102 also includes flexible latches 150 extending outward from opposite side walls 152 thereof. The flexible latches 150 have release pads 154 separating retention ledges 156 and resistance panels 158. The interconnect module 102 may be inserted into a patch panel, a wall mounted box, in a floor box, or any number of other network connection structures (not shown in FIG. 1) and retained therein by the operation of the latches 150.

The plug assembly 104 includes an adapter module 170 and a a pair of plugs 178 that are mounted in the adapter module 170 which holds the two plugs 178 as a unit. In an exemplary embodiment, the plugs 178 are fiber cable plugs and carry signal information. Each of the plugs 178 is attached to a signal cable 182 that, in an exemplary embodiment may be a fiber cable. In a duplex connection, two cables 182, one for sending and one for receiving, are needed for making the connection. The adapter module 170 includes a sensor probe 190 that is connected to a sensor cable 192 that provides a signal to a network monitoring system (not shown). In an exemplary embodiment, the sensor probe 190 is common to the two plugs 178, that is the sensor probe 190 is shared by the plugs 178 so that the connection of the two plugs 178 to the interconnect module 102 is sensed by the network monitoring system as a single connection to the network. The cables 182 extend to a first network component (not shown) that, by way of example only, may be a server or another interconnect module 102.

The receptacle jack 120 receives the plugs 178. When the plugs 178 are fully received in the receptacle jack 120, the sensor probe 190 contacts and electrically engages the corresponding sensor pad 138, thereby enabling sensor signals to pass in either direction between the plug assembly 104 and interconnect module 102. The mating of the two fiber cable plugs 178 is recognized as one connection on the network by the monitoring system.

Figure 2:
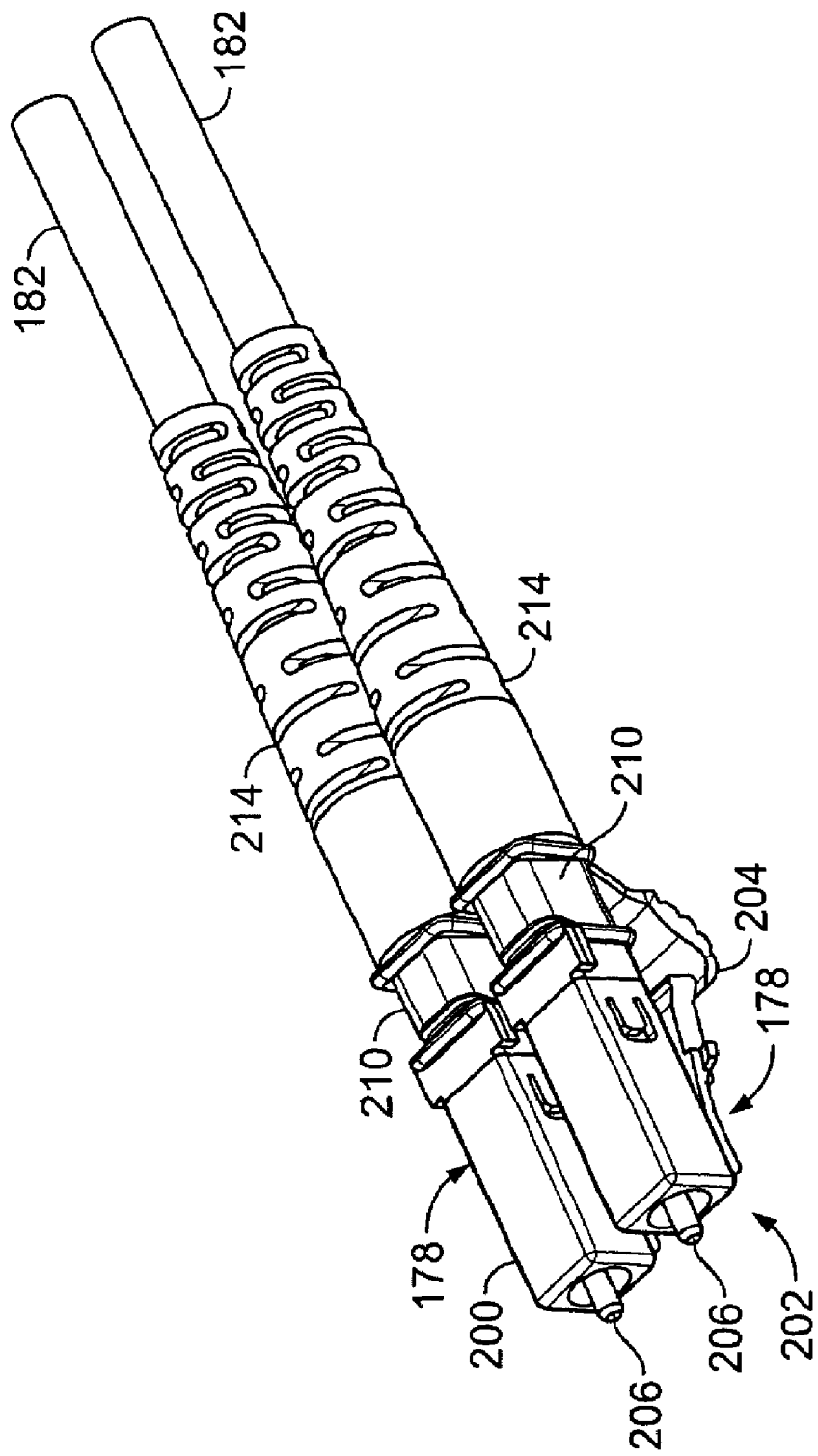
FIG. 2 is a perspective view of the plugs shown in FIG. 1.

FIG. 2 is a perspective view of the plugs 178 shown in FIG. 1. In an exemplary embodiment, the plugs 178 are fiber cable plugs. Each fiber cable plug 178 includes a plug housing 200 that has a mating end 202 and a latch 204 that latches the fiber cable plug 178 in the receptacle jack 120 (FIG. 1) in the interconnect module 102 (FIG. 1). A fiber tip 206 extends from the mating end 202. A recess 210 extends about a perimeter of a rearward portion of the plug housing 200 for attachment of the cable plug 178 to the adapter module 170. A strain relief boot 214 extends from the recess 210 and covers a portion of the fiber cable 182.

Figure 3:
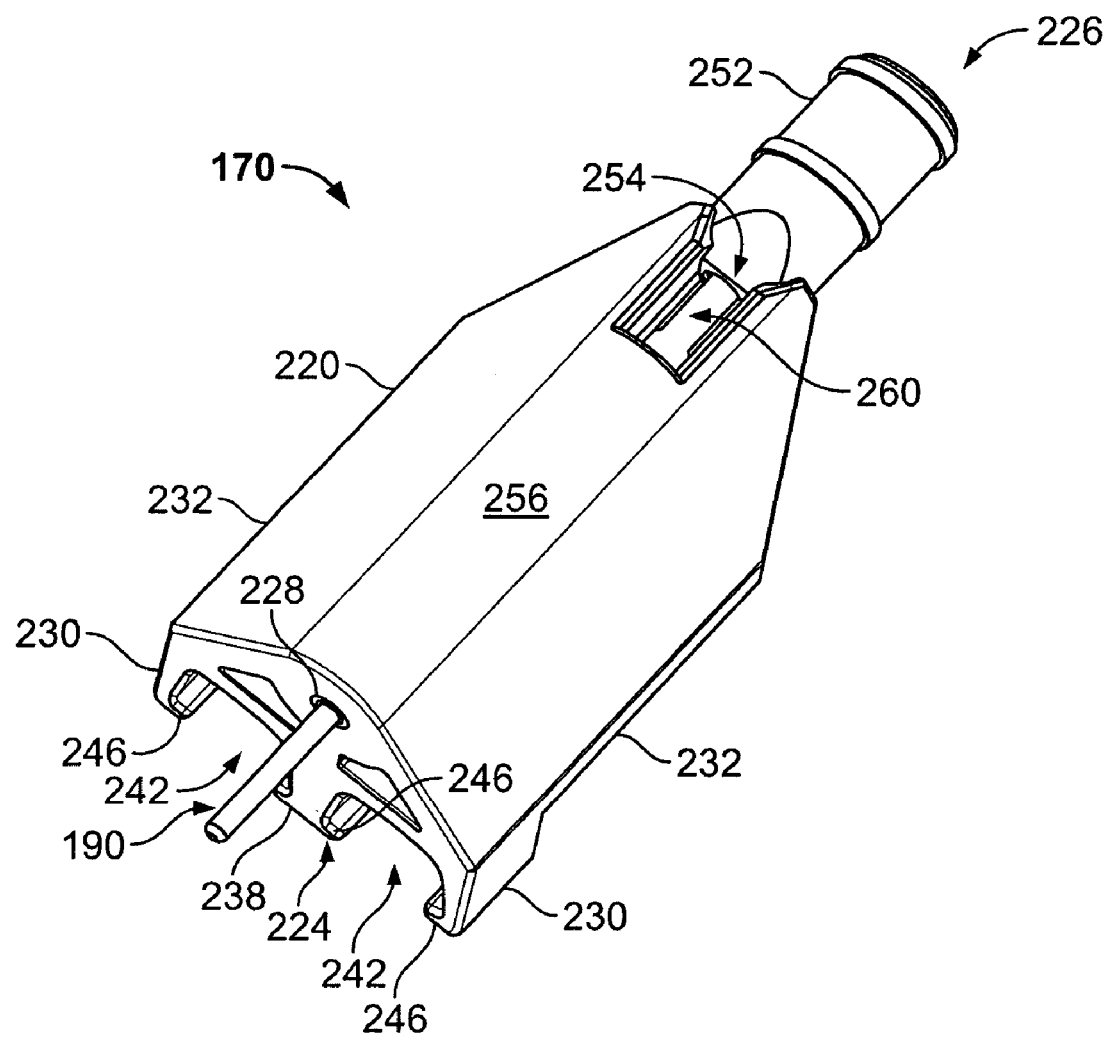
FIG. 3 is a perspective view of the adapter module shown in FIG. 1.

FIG. 3 is a perspective view of the adapter module 170. The adapter module 170 includes a housing 220 that has a forward end 224 and a rearward wire receiving end 226. The housing 220 includes a passageway 228 that extends through the housing 220 from the forward end 224 to the rearward end 226. The sensor probe 190 is received in the passageway 228 proximate the forward end 224 of the housing 220 and extends from the forward end 224. Clamping arms 230 are formed on the housing 220 proximate the forward end 224 and extend from side edges 232 of the housing 220. A clamping post 238 is positioned between the clamping arms 230. The clamping post 238 and the clamping arms 230 cooperate to define cable retention channels 242 that receive the recesses 210 in the plug housings 200 (FIG. 2) to mechanically couple the fiber cable plugs 178, or more generally, the fiber cables 182, to the adapter module 170. The clamping arms 230 and the clamping post 238 include retaining latches 246 that secure the plug housings 200 in the retention channels 242. In an exemplary embodiment, the plug housing 200 is received in the retention channels 242 with a snap fit.

A tubular extension 252 is formed at the rearward end 226 of the adapter module 170. The tubular extension 252 receives the sensor cable 192 (FIG. 1) at the wire receiving end 226 of the housing. The adapter module 170 also includes an access window 254 in an upper surface 256 of the adapter module 170 that is open to the passageway 228. A chamber 260 formed in the passageway 228 is open to the window 254 to provide access to the chamber 260 for testing or troubleshooting an electrical connection between the sensor probe 190 and a contact 270 (FIG. 4) within the adapter module 170.

Figure 4:
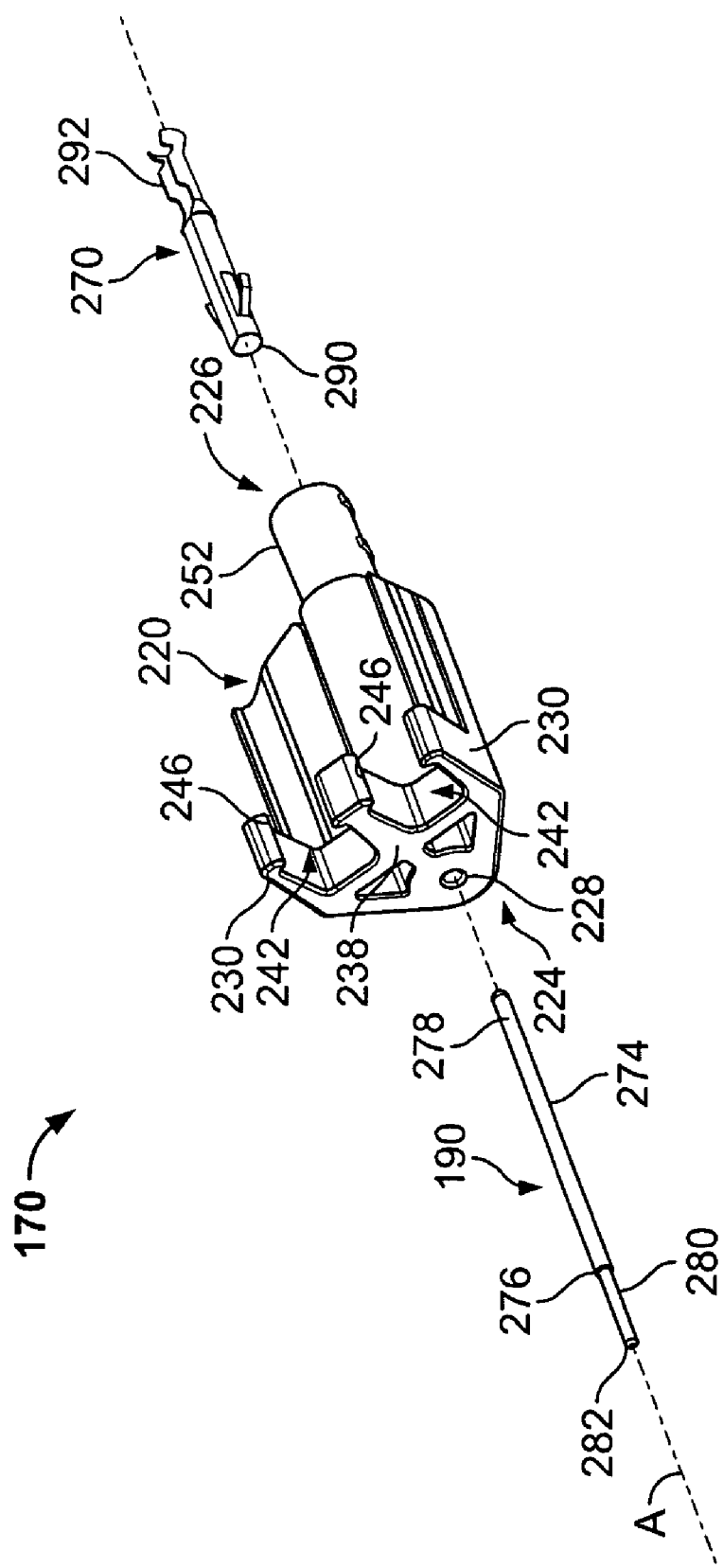
FIG. 4 is an exploded view of the adapter module shown in FIG. 3.

FIG. 4 is an exploded view of the adapter module 170. The adapter module 170 includes the sensor probe 190, which is shared by the fiber cable plugs 178 (FIG. 2), the housing 220, and a contact 270. The sensor probe 190 includes a body 274 that has a forward end 276 and a rearward end 278. A plunger 280 extends from the forward end 276. The plunger 280 has a tip 282. The plunger 280 extends from the forward end 276 of the body 274 and telescopes into the body 274. In other words, pressure on the tip 282 forces the plunger 280 to retract into the body 274. The body 274 includes an internal spring (not shown) that biases the plunger 280 in an extended position.

The housing 220 includes the passageway 228 that extends through the housing 220 along a centerline A. The sensor probe 190 is received in the passageway 228 from the housing forward end 224. The clamping arms 230 and the clamping post 238 define cable retention channels 242 that receive the fiber cable plugs 178 (FIGS. 1 and 2). The clamping arms 230 and the clamping post 238 cooperate to retain fiber cable plugs 178 in the retention channels 242 to thereby mechanically couple the fiber cable plugs to the housing 220.

The contact 270 includes a forward mating end 290 and a wire terminating end 292. The sensor cable 192 (FIG. 1) is attached to the terminating end 292 of the contact 270. The contact 270 is received in the housing 220 through the tubular extension 252. The contact 270 is held in a contact chamber (not shown in FIG. 4) within the housing 220. The contact 270 is inserted into the housing 220 after being connected or terminated to the sensor cable 192. The sensor probe 190 is then inserted through the forward end 224 of the housing 220. The rearward end 278 of the sensor body 274 is then joined with the mating end 290 of the contact 270. In an exemplary embodiment, the rearward end 278 of the sensor probe body 274 are joined in a pin and socket type connection with an interference fit.

Figure 5:
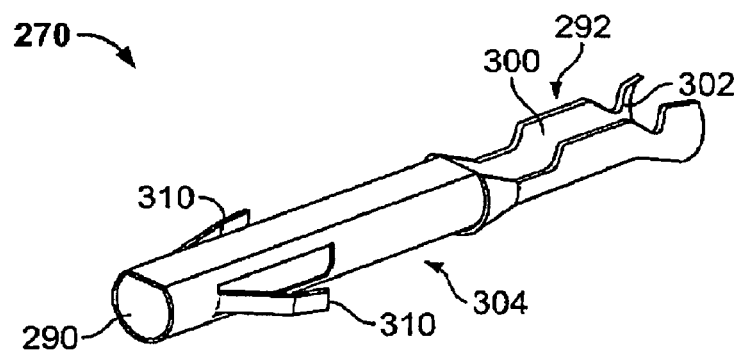
FIG. 5 is a perspective view of the contact shown in FIG. 4.

FIG. 5 illustrates a detailed perspective view of the contact 270. The contact terminating end 292 includes a wire crimp area 300 and an insulation crimp area 302. The contact 270 includes a body portion 304. A plurality of wings 310 are formed in the body portion 304. The wings 310 engage an interior of the adapter housing 220 (FIG. 4) to retain the contact 270 in the housing 220 as will be explained.

Figure 6:
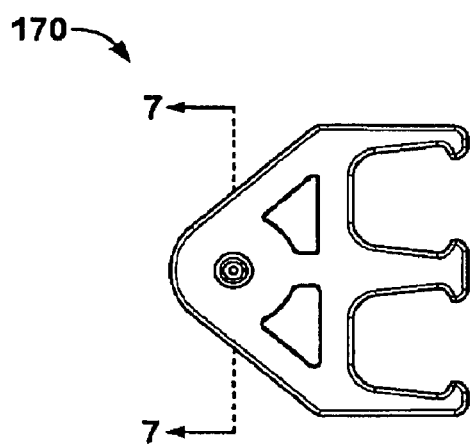
FIG. 6 is an end view of the adapter module shown in FIG. 3.
Figure 7:
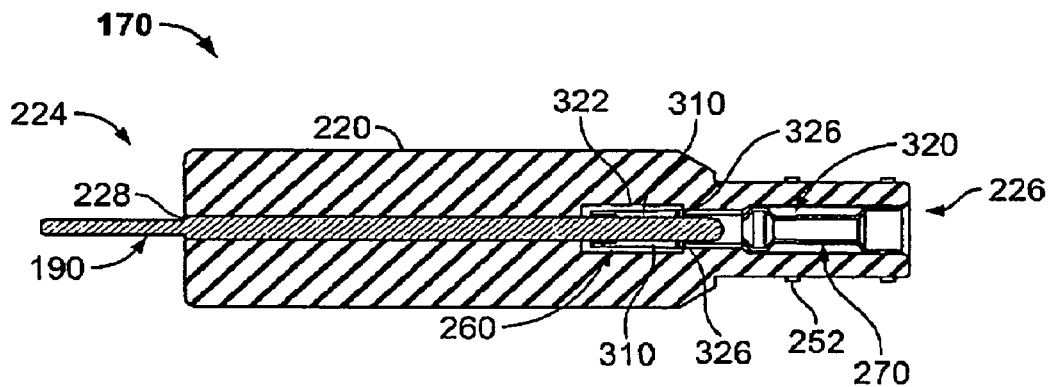
FIG. 7 is a cross sectional view of the adapter module shown in FIG. 6 taken along the line 7-7.

FIG. 6 is an end view of the adapter module 170. FIG. 7 is a cross sectional view of the adapter module 170 taken along the line 7-7 in FIG. 6. In FIGS. 6 and 7, the contact 270 is loaded into the housing 220 and mated or joined with the sensor probe 190. In practice, the contact 270 is first terminated to the sensor cable 192 and then the contact 270 and the cable 192 are inserted into the wire receiving end 226 of the housing 220. The sensor probe 190 is then joined with the mating end 290 of the contact 270. In an exemplary embodiment, the contact 270 and the sensor probe 190 are joined with a pin and socket connection. The passageway 228 extends through the housing 220 from the forward end 224 to the rearward wire receiving end 226. A contact chamber 320 is formed in the tubular extension 252 proximate the rearward end 226. The contact chamber 320 is coextensive with the chamber 260 forward of the chamber 320. The chambers 320 and 260 receive the contact 270. The contact chamber 260 includes shoulders 326 that comprise a rearward edge of the contact chamber 260. The wings 310 of the contact 270 expand to engage the shoulders 326 to inhibit extraction of the contact 270 after the contact 270 is loaded into the housing 220. The sensor probe 190 is separable from the contact 270 and can be removed if necessary for repair or replacement.

The embodiments thus described provide an adapter module 170 used in monitored network systems to sense and report network interconnect activity to a monitoring station or control station. The adapter module 170 enables a duplex connection to a network to be sensed as a single connection. The two cables 182 of the plugs 178 are mechanically coupled to the housing 220 of the adapter module 170. The adapter module includes a contact 270 that electrically connects a sensor probe 190 to a sensor cable 192 that is connected to the network monitoring system. The sensor probe 190 is shared between two fiber cable plugs 178.

While the invention has been described in terms of various specific embodiments, those skilled in the art will recognize that the invention can be practiced with modification within the spirit and scope of the claims.

What is claimed is:

1. A duplex plug adapter module comprising:
a dielectric housing having a forward end and a rearward wire receiving end, said housing configured to be mechanically coupled to first and second signal cables;
a contact held within said housing, said contact having a forward mating end and a rearward wire terminating end;
a sensor probe at least partially received within a passageway of said housing, said sensor probe being shared by the first and second signal cables, and wherein said contact interconnects the sensor probe and a sensor wire.

2. The adapter module of claim 1, wherein said passageway extends from said forward end to said rearward end, and wherein the sensor probe is received in said passageway at said forward end of said housing and the sensor wire is received in said passageway at said rearward end of said housing.

3. The adapter module of claim 1, wherein said housing further includes a tubular extension at said rearward end, said tubular extension receiving said contact and the sensor wire.

4. The adapter module of claim 1, wherein said housing includes a chamber therein, said chamber having an internal shoulder, and wherein said contact is received in said chamber, said contact including a body having wings extending therefrom, said wings engaging said shoulder to inhibit extraction of said contact from said housing.

5. The adapter module of claim 1, wherein said housing includes a chamber therein holding said contact and an outer surface having a window extending from said outer surface to said chamber, said window providing access to an electrical connection between said contact and the sensor probe.

6. The adapter module of claim 1, wherein said contact is connected to the sensor probe with a pin and socket connection.

7. The adapter module of claim 1, wherein said housing includes clamping arms and a clamping post, said clamping arms and clamping post defining cable retention channels therebetween, said cable retention channels configured to receive the first and second signal cables.

8. The adapter module of claim 1, wherein said housing includes clamping arms and a clamping post, said clamping arms and said clamping post including latches configured to secure the first and second signal cables between said clamping arms and said clamping post.

9. A duplex plug adapter module comprising:
a dielectric housing configured to be mechanically coupled to first and second signal cables; and
a sensor probe received in said housing, said sensor probe extending external to said housing along a length of said housing, said sensor probe being shared by the first and second signal cables.

10. The adapter module of claim 9, wherein said housing includes clamping arms and a clamping post, said clamping arms and clamping post defining cable retention channels therebetween, said cable retention channels configured to receive the first and second signal cables.

11. The adapter module of claim 9, wherein said housing includes clamping arms and a clamping post, said clamping arms and said clamping post including latches configured to secure the first and second signal cables between said clamping arms and said clamping post.

12. The adapter module of claim 9, wherein said housing further includes a passageway extending therethrough and said sensor probe is received in said passageway.

13. The adapter module of claim 9, wherein said housing further includes a tubular extension at said rearward end, said tubular extension configured to receive a sensor wire from the network monitor.

14. The adapter module of claim 9, wherein said housing includes a chamber therein, and a contact received in said chamber, said chamber having an internal shoulder, and wherein said contact includes a body having wings extending therefrom, said wings engaging said shoulder to inhibit extraction of said contact from said housing.

15. The adapter module of claim 9, wherein said housing includes a chamber therein holding a contact and an outer surface having a window extending from said outer surface to said chamber, said window providing access to an electrical connection between said contact and the sensor probe.

16. A duplex connector assembly comprising:
- a dielectric housing having a forward end and a rearward wire receiving end and a passageway extending therebetween;
- a sensor probe received in said passageway proximate said forward end;
- a pair of cable retention channels formed on said housing;
- a pair of signal cables, each of which is received in a respective one of said cable retention channels to mechanically couple said signal cables to said housing; and
- a contact held within said housing, said contact interconnecting said sensor probe and a sensor wire.

17. The adapter module of claim 16, wherein said sensor probe is shared by said pair of signal cables.

18. The adapter module of claim 16, wherein said housing further includes a chamber therein and said contact is received in said chamber, said chamber having an internal shoulder, and said contact including a body having wings extending therefrom, said wings engaging said shoulder to inhibit extraction of said contact from said housing.

19. The adapter module of claim 16, wherein said housing further includes a chamber therein, said contact being received in said chamber, and an outer surface having a window extending from said outer surface to said chamber, said window providing access to an electrical connection between said contact and the sensor probe.

20. The adapter module of claim 16, wherein said housing includes clamping arms and a clamping post, said clamping arms and said clamping post including latches configured to secure the first and second signal cables in said cable retention channels.

\* \* \* \* \*